United States Patent [19]

Grant

[11] Patent Number: 4,630,823
[45] Date of Patent: Dec. 23, 1986

[54] VIDEO GAME CONTROL BOX HOLDER

[76] Inventor: Timothy L. Grant, 582 Kellogg, Apt. A, Ann Arbor, Mich. 48105

[21] Appl. No.: 547,032

[22] Filed: Oct. 31, 1983

[51] Int. Cl.[4] .......................... A63B 71/00; A63F 9/00
[52] U.S. Cl. ................................................ 273/148 B
[58] Field of Search .................... 273/148 B; 108/43; 248/291, 179; 297/4, 252, 232, 452, 467

[56] References Cited

U.S. PATENT DOCUMENTS

| D. 273,165 | 3/1984 | Sternberg | 273/148 B |
| 951,145 | 3/1910 | McGennis | 108/43 X |
| 953,485 | 3/1910 | Moore | 16/124 |
| 2,112,696 | 3/1938 | Gough | 248/500 |
| 2,120,404 | 6/1938 | Graff | 248/346 X |
| 2,318,633 | 5/1943 | Ries | 248/183 |
| 3,906,648 | 9/1975 | Bard | 108/43 X |
| 4,422,640 | 12/1983 | Tamarkin | 273/148 R |
| 4,494,754 | 1/1985 | Wagner, Jr. | 273/148 B |

FOREIGN PATENT DOCUMENTS 812680 7/1951 Fed. Rep. of Germany ........ 108/43

OTHER PUBLICATIONS

"Lap Chap" advertisement, copy obtained 3-1984, found in A.U 334.

Primary Examiner—Richard C. Pinkham
Assistant Examiner—Gary Jackson

[57] ABSTRACT

A portable holder device for a portable control box for a home type video game having fire button and/or joystick or ball type control elements includes a base member on which the game player can sit or kneel. A connecting tube extends upwardly from the base generally between the player's legs or knees and a control box is held secured to the connecting tube in a manner so as to be disposed generally at the player's lap. The holder has a cavity to receive the control box and a clamping member to secure the control box in the holder. The clamping member extends over the control box without interfering with operation of the control elements. The holder member has finger grooves to facilitate thumb operation of control elements. One form of the device has adjustments between the base and the connecting member and/or the holder member to facilitate comfortable positioning of the holder member.

1 Claim, 9 Drawing Figures

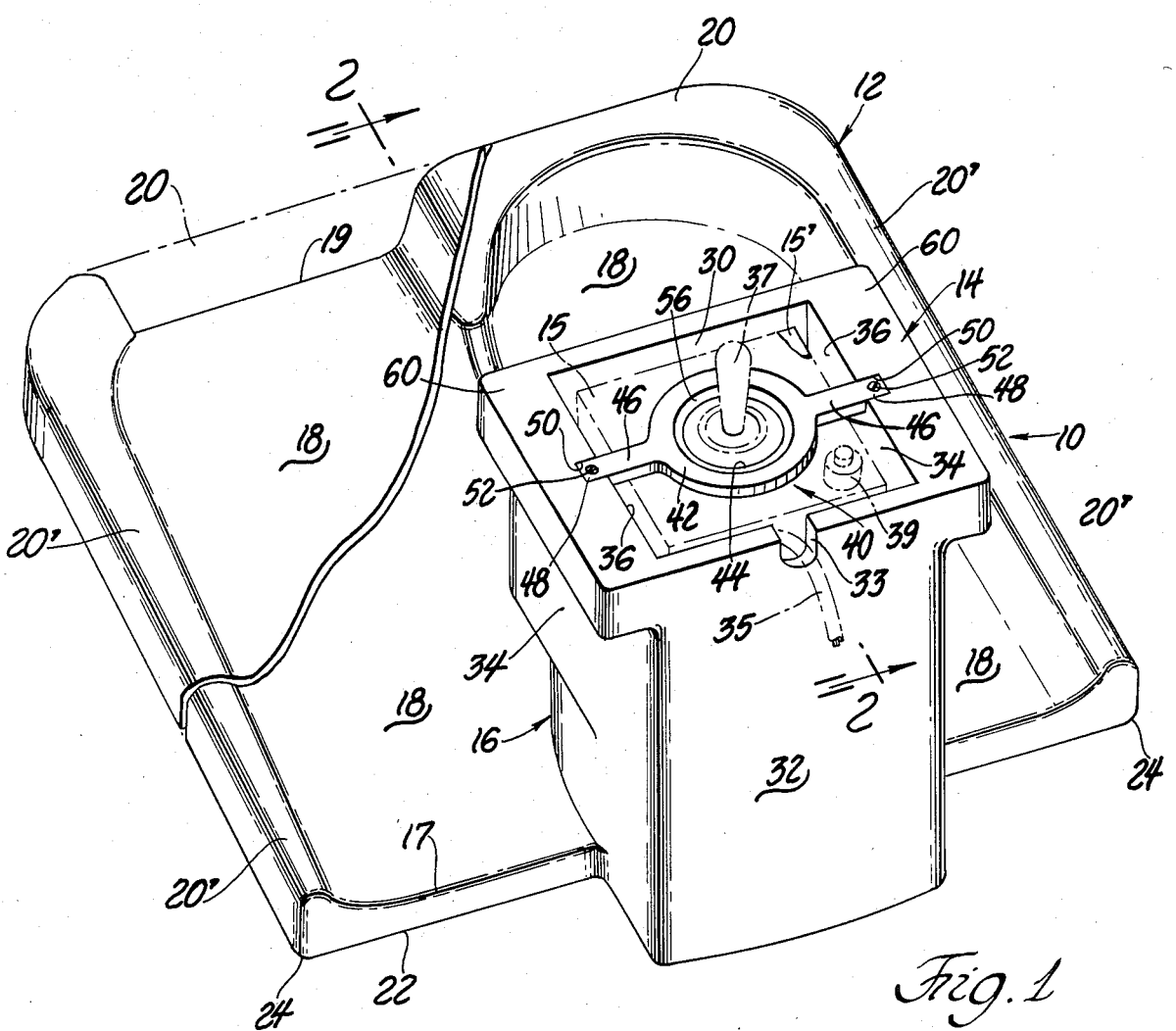
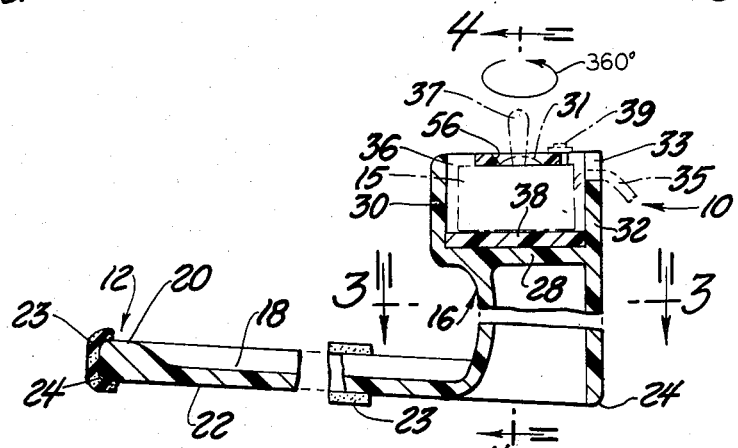
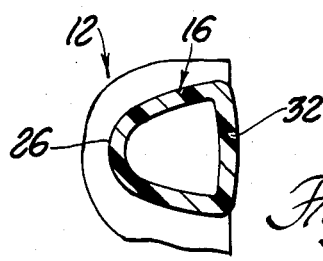
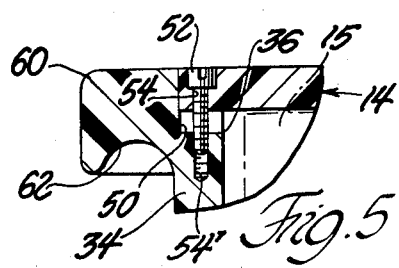

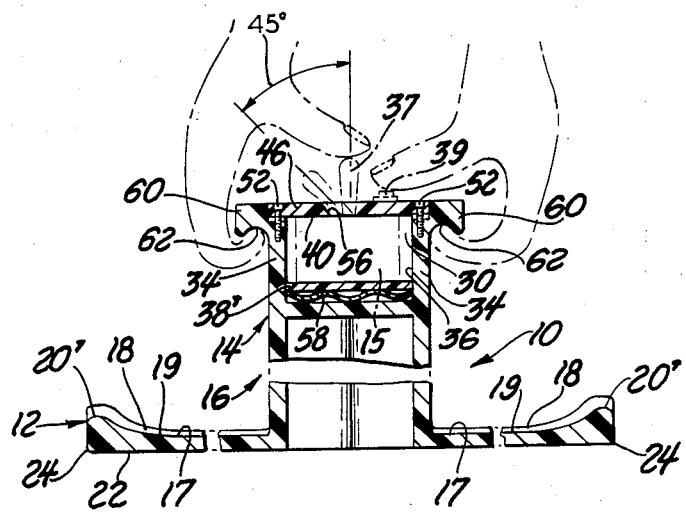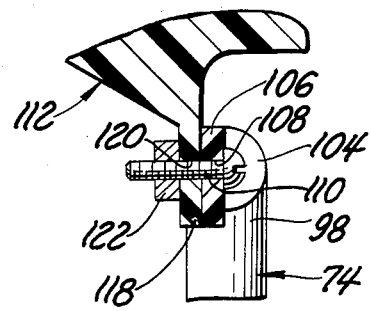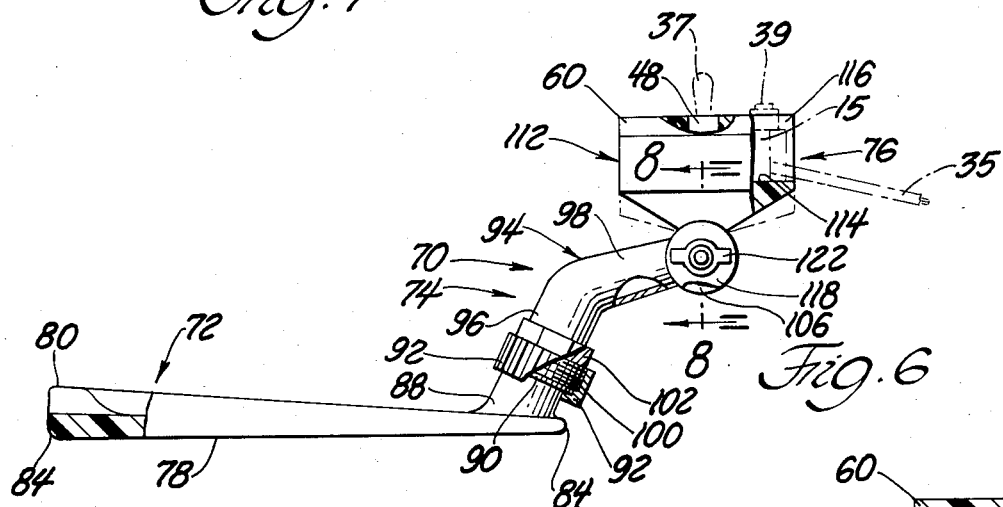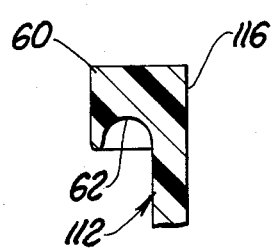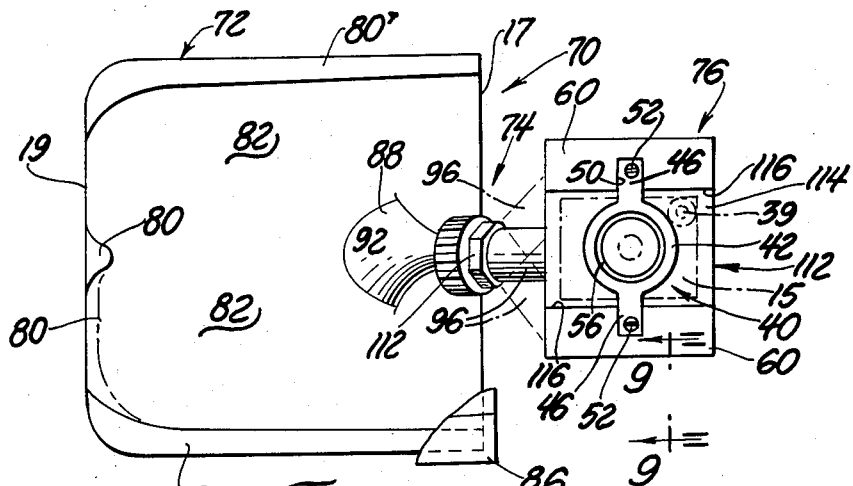

VIDEO GAME CONTROL BOX HOLDER

BRIEF SUMMARY OF THE INVENTION

This invention relates generally to video games and more particularly to an accessory for, or improvement in, home TV or other video games having a control box with joystick or ball and fire button control elements.

A home TV video game is an electronic game device that is used in association with a home TV screen. That is, elements of the game are connected to the home TV set so that the home TV screen provides the visual display for the game. Other video games are part of a home computer having a screen.

Some examples of well-known home TV or computer video games are various (1) sports games such as, hockey, tennis, golf, and the like. (2) space games, some of which are names "Space Invaders", "Asteroids", "Missile Command", etc. and (3) other similar games like those named "Pac-Man", "Donkey Kong", "Frogger", "Superman" and "ET".

Typically, such games may include various elements, one of which is a control box element having a toggle type control referred to as a "joystick," which may be an eight-position pivotable lever element used to perform an action-aiming or other similar function, and a control referred to as a "fire button" element used to activate the aimed action. For example, the fire button may fire a rocket, which is aimed by use of the joystick, at a target. Some control boxes have a 360° position ball type control, rather than a joystick control.

Some TV video games may have more than one control box, one for each player (as in a tennis game), and there may be no fire button, but only a pivotable aiming lever or ball.

The 1982 catalogue of Winco Corporation, Consumer Division entitled "Winco Command Control" illustrates video game control boxes of this type, for which the invention is intended.

In any event, the control box of a typical home TV or computer video game is a metal or plastic box having the toggle type joystick extending upwardly from the top thereof, for operation with one hand, and the fire button in a top corner thereof for operation with the other hand. Such control boxes are supported by resting the same on the player's lap, the floor, a table or the like, or simply held in the player's hand(s).

However, such manual support of the control box is quite unsatisfactory for ultimate control, since aiming and/or firing is, to a substantial degree, compromised because the control box cannot be supported absolutely rigidly. That is, better control is possible where the control box is rigidly supported.

The invention contemplates a holder device that does not require use of the hands, for rigidly supporting such a control box element, leaving the hands free for operation of the controls.

Accordingly, a specific main object of the main invention is to provide a holder device that comprises a base means, control box holder means and means connecting the base means and the holder means, whereby the game operator or player rigidly anchors the device by sitting or kneeling on the base means, with the connecting and holder means disposed between his legs or knees, leaving the hands free to manipulate the joystick and the fire button, if any.

Some of the other objects of the invention are to provide such a holder device wherein (a) the base means is contoured so as to provide comfort for the game player, while sitting or kneeling, and to prevent the same from moving away from the operator during the game, (b) the control box holder includes at least one shim or other means to enable rigid clamping therein of control boxes of varying heights, (c) the box holder includes a removable clamp for engaging the control box by means permitting access to the joystick and fire button controls, (d) the clamp is formed with a circular opening having sloped sides to facilitate 360° angular motion of the joystick, and/or to permit access of the player's fingers to a ball type control, (e) the box holder includes shoulder means to be engaged by the player's fingers for thumb operation of the joystick, ball and/or fire button controls, (f) the attachment of the connecting means to the base means includes adjustment means and (g) the attachment of the connecting means to the box holder means includes adjustment means.

These and other objects and advantages will become more apparent by reference to the following specification, together with the attached drawings, wherein like elements are identified by like reference numerals.

BRIEF DESCRIPTION OF THE SEVERAL VIEWS OF THE DRAWINGS

FIG. 1 is a perspective view illustrating a holder device embodying the invention.

FIG. 2 is a reduced cross-sectional view, taken on the plane of line 2—2 of FIG. 1, looking in the direction of the arrows.

FIG. 3 is a fragmentary cross-sectional view taken on the plane of line 3—3 of FIG. 2, looking in the direction of the arrows.

FIG. 4 is a cross-sectional view taken on the plane of line 4—4 of FIG. 2, looking in the direction of the arrows.

FIG. 5 is an enlarged fragmentary portion of FIG. 4 illustrating certain elements thereof in greater detail.

FIG. 6 is a side elevational view of another embodiment of the invention.

FIG. 7 is a top plan view of the embodiment shown in FIG. 6.

FIG. 8 is a fragmentary cross-sectional view taken on the plane of line 8—8 of FIG. 6, looking in the direction of the arrows.

FIG. 9 is a fragmentary enlarged cross-sectional view taken on the plane of line 9—9 of FIG. 7, looking in the direction of the arrows.

DETAILED DESCRIPTION

Referring now to the drawings in greater detail, FIGS. 1-5 illustrate a control box holder device 10 comprising a base portion or means 12, a control box holder portion or means 14 and a connecting portion or means 16.

While device 10 can be made of any desired materials, it is preferable to form the same from durable, lightweight materials, such as plastics, that can be injection molded and that can be placed or used on furniture without causing excessive wear thereof. For that purpose, it may be preferable that at least the base portion 12 of the device 10 be made from a relatively flexible type plastic material.

It will be noted that base portion 12 may be molded with depressions 18 for the player's buttocks and thighs, resulting in a peripheral ridge 20/20' that prevents the base from slipping away from the game player. Alternatively, and preferably, as illustrated by line 19 in broken away portion of FIG. 1 and in FIG. 4, the ridge portions 20 may be eliminated so that the depressions 18 extend across the base means 12, to allow the player to kneel (rather than sit) on the base without leg discomfort that would result from ridge portions 20. Some players, especially small children, prefer the kneeling position.

Preferably, the bottom surface 22 of the seat is flat and smooth, with rounded edges 24, so as not to mar or wear furniture on which the seat 12 may be placed or used. If desired, the base means 12 might be padded (as with a plastic or rubber foam envelope 23) for additional comfort and protection from marring of furniture.

The connecting portion 16 is preferably rounded, as at 26 in FIG. 3, so as to comfortably fit into the player's crotch and midsection areas, without angular edges that might cause discomfort during play.

The control box holder means 14 (for the control box 15 shown in broken lines) is formed at the upper end of the connecting means 16, and it comprises a bottom wall 28, a rear end wall 30, a front end wall 32, and left and right side walls 34.

Since the configuration and dimensions of control boxes made by different manufacturers may vary, the length, width and depth of the box holder cavity or recess 36 formed by the walls 28, 30, 32 and 34 is preferably formed large enough to receive the largest known control box. Alternatively, the holder 14 can be made with variably-sized cavities 36. Additionally, any suitable means may be provided to compensate for different control box heights, such as one or more shim elements 38, for a purpose to be described. Also, one of the walls (preferably front end wall 32) is formed with a preferably upwardly-open slot 33 positioned appropriately to receive the electrical power cord 35 normally extending from the control box 15 for connection to the usual game console element (not shown). The control box 15 is shown in solid lines at 15' in FIG. 1.

It will be noted that the control box 15 is illustrated as having a toggle type joystick control 37 (or a ball type control 31 shown in FIG. 2) and a fire button 39. The joystick 37 is usually mounted to the box 15 in a manner so that the free end thereof can be rotated 360° (usually with eight contact positions) at an angle of perhaps 45° with respect to the horizontal top surface of the box 15. A ball control 31 is merely rotated to any desired position.

Whether or not an appropriate shim 38 is employed, the final adjustable retention of box 15 in holder means 12 is by a clamp element 40, comprising an intermediate ring portion 42 having a circular opening 44 and oppositely extending arm portions 46. The free ends 48 of arms 46 are received in slots 50 formed in the tops of side walls 34, and retained therein by means such as screws 52 received in aligned threaded passages 54 and 54' formed in the ends 48 and side walls 34, respectively. It is noted, as shown in FIG. 5, that the slots 50 are deeper than the clamp ends 48 are thick, and the threaded passages 54/54' are deeper than the screws 50 are long, so that the screws 52 can force the clamp 40 down against the top of the control box 15.

Thus, with the use of an appropriate shim (or shims) 38, if needed, and the clamp element 40 variably positionable vertically by screws 52, control boxes 15 of various heights can be rigidly retained (clamped) in the box holder means 14. It will be apparent that the joystick 37 can then be manipulated in any desired direction, the wall 56 of the opening 44 being sloped to provide better clearance between joystick 37 and the ring 42 when the joystick is tilted in any direction from the vertical position. The sloped wall 56 also provides access to a ball 31 control element used instead of a joystick control 37. It is further noted that since the clamp 40 is formed with the ring 42, the player has accessibility to the fire button control 39, regardless of where it is located on the control box 15.

Of course, other control box retaining means might be employed, and/or wavy washer compression spring means 58 of FIG. 4 may be disposed between shim 38' and bottom wall 28 to retain the control box 15 in the holder 14 under compression.

It will be further noted that finger grip elements 60 having grooves 62 formed in the bottom surface thereof are preferably provided to receive the player's fingers, so that the player's thumbs can be conveniently used (as shown in broken lines in FIG. 4) to operate the joystick 37 (or ball 31) and fire button 39 for improved control while the player sits or kneels on the base means 12 to maintain the holder device 10 rigidly anchored. That is, improved game operation results from the fact that the player's hands are used only to operate the controls 37 (or 31) and 39, rather than trying to simultaneously hold the entire control box 15 steady with the hands. With use of the device 10, the player's weight holds the box 15, the hands being free to operate the joystick (or ball) and fire button controls 37 (or 31) and 39.

While other configurations or modifications are possible, the device 10 of FIGS. 1–5 is essentially a one-piece device, except for shim 38, spring 58, clamp 40, screws 52 and foam or other padding 23, if any.

FIGS. 6–9 illustrate a modification of the holder device having certain additional features embodying the invention. However, like device 10 of FIGS. 1–5, holder device 70 of FIGS. 6–9 still comprises three general portions or means, these being base portion 72, connecting portion 74 and holder portion 76.

As in the case of device 10, the device 70 may be made of any desired materials, such as injection molded plastic materials, with some of the same structural preferences as those referred to in relation to device 10. In either case, where certain elements are made from plastics, some of the other elements may comprise metal parts, such as the screws 52 of device 10 and certain similar elements of device 70.

Referring again to device 70, the base means 72 is similar to base 12 of device 10 in that it may be made of any desired size or shape, and with a flat bottom 78, a rear and side ridge 80/80' (or only the side ridge portions 80'), buttock/thigh depressions 82 (or knee depressions 82 extending the full length of the base 72, from edge 17 to edge 19) and rounded edges 84. A foam pad envelope 86 may be provided, like pad 23 of device 10, for additional comfort and protection, if desired, as where the base material might possibly scratch furniture, etc.

The front portion of base 72 is formed, between the open ends of depressions 82, with an annular post 88 extending forwardly (away from the player) at an angle with respect to the base 72, the post having any suitable means such as an annular flange 90 retaining an internally threaded coupling member 92 thereon, for a purpose to be described.

The connecting portion or means 74 comprises a generally tubular bracket element 94 having portions 96 and 98 extending at an angle to one another. The free end of portion 96 is formed with external threads 100 and a hexagonal gripping portion 102.

As further shown in the broken-away portion of FIG. 6, the bracket 94 may be connected to the seat post 88 by seating the threaded free end 100 on flange 90 and tightly threading the internally threaded coupling member 92 on the threads 100. As shown by the broken lines in FIG. 7, the angled bracket 94 may be secured in various positions by rotating the bracket before securing the same with the coupling. This provides height and lateral adjustment in the connecting portion 74, to provide selection of the most comfortable position of the control box 15, as retained by the holder portion 76.

It is apparent that other specific means could be provided for connection of connecting portion 74 to the base means 72 to provide the desired adjustment.

Portion 98 of the bracket 94 may be formed at the free end 104 thereof with a flat generally circular portion 106 having a passage 108 receiving a screw 110, for a purpose to be described. First, however, the control box holder means 76 of device 70 will be described.

As seen in FIGS. 6-9, holder means 76 comprises a body 112 formed with a open-ended cavity defined by a bottom wall 114 and only opposite side walls 116. That is, since there are no front and rear end walls, the cavity is open at the ends thereof. The bottom wall 114 is adapted to support a control box 15 shown in broken lines and having a joystick control 37 (or ball control 31) and usually a fire button 39, as described above in connection with FIGS. 1-5. With no end walls, the electrical lead wire 35 can extend through the open front end of the cavity.

As in FIGS. 1-5, the side walls 116 are formed with finger grip elements 60 having grooves 62 for the same purposes as already described above. Also, as already described in connection with FIGS. 1-5, the holder means 76 is provided with the same clamp means 40 having the intermediate ring portion 42 for engaging the top of the control box 15 around the joystick 37 (or ball 31) control element and the arms 46 adjustably seacured in slots 50 by screws 52. Also, a shim 38, or a shim 38° and compression spring 58, may be employed in clamping the control box 15 in the holder means 76.

As seen in FIGS. 6 and 8, the lower portion of body 112 may be tapered to a generally flat circular portion 118 mating with circular portion 106 formed at the free end of bracket portion 98 and also having a central passage 120 receiving the screw 110. A wing nut 122 is threaded on screw 110 for clamping the portions 106 and 118 together to secure the holder means 76 to connecting means 74. The adjacent faces of portions 106 and 118 may be serrated to lock the same in any relative positions thereof. That is, with the wing nut 122 loosened, the body 112 can be rotated on screw 110 toward and away from the player and locked in any desired position by tightening the wing nut 122, for more convenient positioning of the holder means 76.

The adjustments of the connecting means 74 with respect to the base, and the holder 76 wtih respect to the connecting means 74, enable the same device 70 to be used by adults or small children, and to be adjusted to the best position for the individual player.

Operation of the Invention

Commercial video games such as those provided in arcades are mounted in sturdy cabinets having a substantially horizontal surface in which the joystick or ball control(s) and the fire button control(s), if any, are mounted. In that case, the player's hands are used only to operate th controls. That is, there is no portable control box to be held in the hands, since the controls are mounted in the cabinet.

In contrast, the controls for a home TV or computer video game are mounted in a portable control box (such as control box 15) that must be anchored or held in or by the player's hands. This must result in the possibility of less effective use of the controls, as compared to the cabinet-mounted controls of commercial video games.

A main object of this invention is to provide means for eliminating the need to anchor or hold the control box of home video games in the hands.

As described in the specification, this object is accomplished by clamping the control box 15 in holder means 14 or 76 and then sitting or kneeling on the base means, thus anchoring the control box in a position at or near the player's lap where the controls can be operated by the player with his hands. Since the player does not have to hold the control box, operation of the controls is enhanced.

In one form of the invention, the control box holder device 10, which is itself portable, is a substantially unitary device, such as may be produced by injection molding a suitable plastic material.

Clamping means 40 extends across the top of the control box 15 and is adjustably secured to the control box walls by screws 52. Since means 40 extends across the center of the box 15 (for stability) where the joystick 37 (or ball 31) control is located, the means 40 includes a ring 42 providing access to those controls. The ring clamp structure also leaves access to other controls, such as the fire button 39.

The connecting means may be merely the point of attachment of the base and holder means, free of the other structure disclosed herein.

One or more shims 38 (or the shim 38' and/or spring 58) may be provided to accommodate control boxes of varying heights, by raising the boxes of lesser height to permit the screws 52 to clamp member 40 downwardly against the box 15, so as to clamp the box against the bottom wall 28 or 114 of the holder means.

In device 70, which may also be formed from molded plastic parts, the connecting means 74 is adjustable with respect to the base means, and the control box holder means 76 is adjustable with respect to the connecting means, so that the device can be adjusted to suit the preference and configuration of the player.

Of course, the devices 10 and 70 can be made in varying specific configurations and sizes, for small children and for adults, for example. Also, if the depressions 18 (or 82) extend the full length of the base, the player can comfortably sit or kneel on the base 12 or 72.

While a limited number of modifications of a device embodying the invention have been shown and described, it is apparent that other modifications are possible. Accordingly, no limitations are intended, except as recited in the appended claims.

What I claim as my invention is:

1. A self-contained portable video game control box holder device for a control box having control means such as a fire button and a joy-stick or a ball control element, said device comprising base means, control box holder means and connecting means connecting said base means and said holder means, said base means being adapted to be itself supported in use of said device by separate support means such as the floor, a chair or the like, and said base means having peripheral spaced front and rear portions and spaced side portions, said connecting means being disposed at said front portion of said base means, said rear portion of said base means being disposed away from said base front portion and said connecting and holder means to the extent sufficient to enable the game operator to sit on said base portion with his buttocks, or to kneel thereon with his knees, without interference with said connecting and holder means, whereby at least the entire upper body weight of the operator including his buttocks is applied to said base to provide maximum stability of said device during use thereof, with no effort required of the operator except sitting or kneeling on said base means, said connecting means having means for adjusting said holder means laterally, vertically and angularly toward and away from the game operator while the operator is sitting or kneeling on said base, said holder means including a bottom wall to support a control box, spaced side walls and control box clamp means supported by and extending between said side walls, said clamp means including means for clamping control boxes of varying sizes, and means adapted to at least partially encircle the joy stick or ball control element to increase stability of the control box in said holder means, said device being constructed or relatively light-weight materials so as to be easily portable.

* * * * *